United States Patent
Yamamoto

[11] 3,797,118
[45] Mar. 19, 1974

[54] DOUBLE-TYPE CONTINUOUS CURVE DRAWING TOOL
[76] Inventor: Kazuko Yamamoto, No. 5-4, 3-chome, Gohongi Meguro-ku, Tokyo, Japan
[22] Filed: June 15, 1972
[21] Appl. No.: 262,986

[52] U.S. Cl. .................................. 33/27 C, 33/158
[51] Int. Cl. ............................................. B43l 9/04
[58] Field of Search.......... 33/27 R, 27 C, 158, 160, 33/173

[56] References Cited
UNITED STATES PATENTS
2,581,858   2/1952   Hilt et al. ............................ 33/27 C
2,651,843   9/1953   Goodford............................ 33/27 C
3,513,548   5/1970   Itano................................... 33/27 C
3,495,334   2/1970   Yamamoto.......................... 33/27 C Primary Examiner—Samuel B. Rothberg
Assistant Examiner—Charles E. Phillips
Attorney, Agent, or Firm—Steinberg & Blake

[57] ABSTRACT

A double-type continuous curve drawing tool comprising two parts, i.e., a supporter A capable of clipping a tape measure at any given point and also having a pivotal pin serving as the center for swinging movement and a fixer B provided on the end of said measure and having a writing tool inserting portion, characterized by said fixer B comprising a rectangular-shaped plate frame fitted with an elastic piece 9 for clipping the measure at the aft end of the back of a plate frame 10 and having in the central portion of the fixer, a right-angled triangular structure 11 with its two sides elevated and with its hypotenuse lying as the base between the right- and left-hand measure passing holes 7 and 8, said fixer B further having a writing tool inserting portion 13 with a taper hole 12 provided at a position which agrees with the central axis of the tape measure M passed through said holes near their fore end.

10 Claims, 6 Drawing Figures

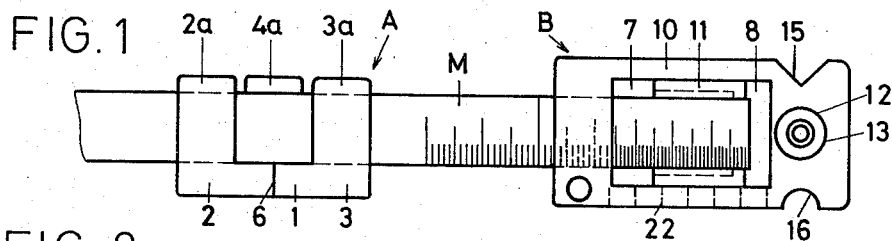
FIG. 1
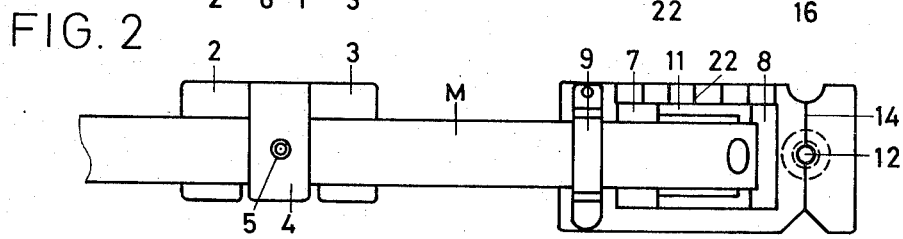
FIG. 2
FIG. 3
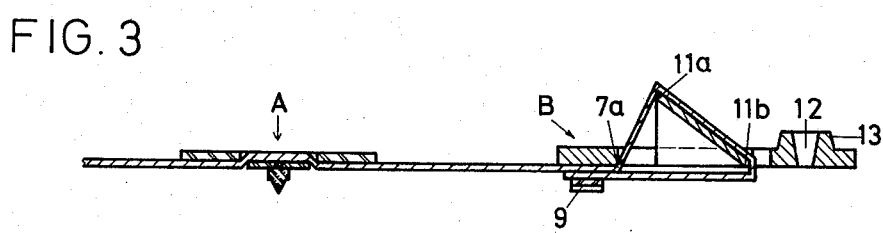
FIG. 4
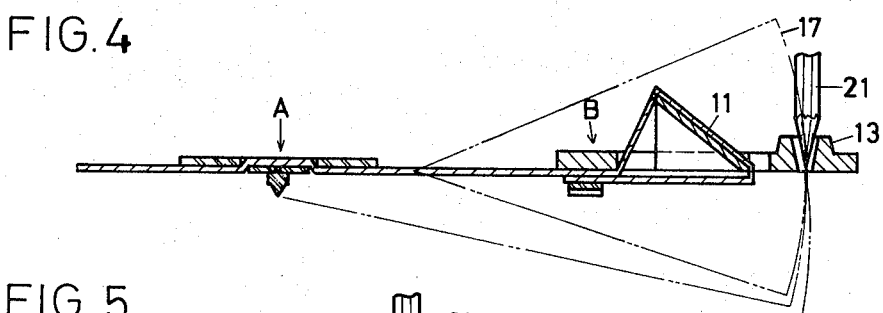
FIG. 5
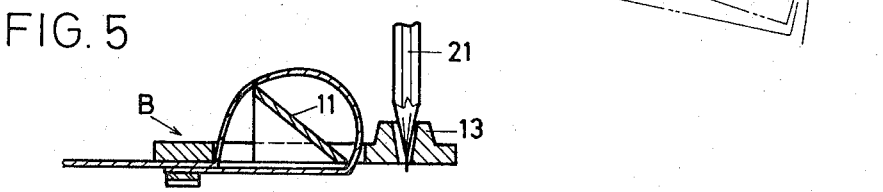
FIG. 6
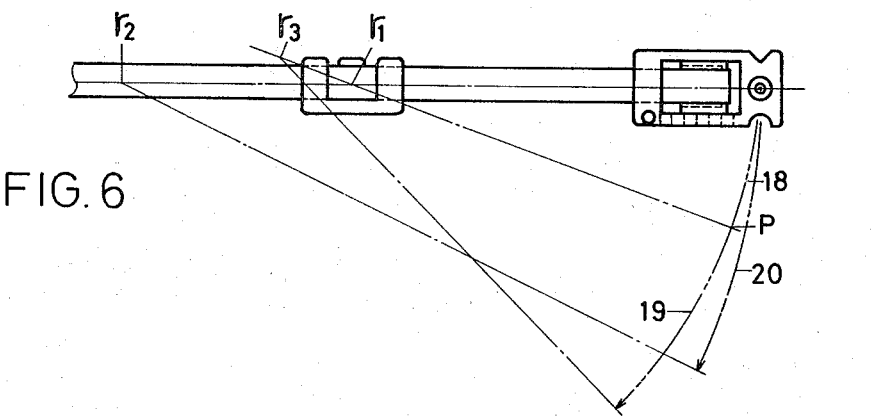

DOUBLE-TYPE CONTINUOUS CURVE DRAWING TOOL

OUTLINE OF THE INVENTION

This invention relates chiefly to a double-type continuous curve drawing device, and has for its main object the easy, sure and rapid drafting of not only true circles and half circles but also wavelike lines, involute curves and other complicated curves and patterns.

BRIEF DESCRIPTION OF THE DRAWINGS

FIG. 1 is the front view of the curve drawing tool of this invention;

FIG. 2 the back view of the same;

FIG. 3, a cross section of the same;

FIG. 4, a diagram showing an example of the way to use the drawing tool of this invention;

FIG. 5, a descriptive drawing showing the state of the tape measure being slackened on the right-angled triangular structure; and FIG. 6, a drawing explaining other way of using this invention as in the ease of FIG. 4.

DETAILED DESCRIPTION OF THE INVENTION

This invention is an improvement of the invention for which the inventor has already taken out a patent in the United States with U.S. Pat. No. 3,495,334 assigned thereto.

The device of the said previously patented invention, which is the original of the present invention, comprises two parts, one of them being a supporter that is capable of clipping a tape measure at any given point and has a pivotal pin serving as the center for swinging movement, and the other a fixer that is fitted to the end of said measure and has on one side thereof a hole whereinto to insert a writing tool. Owing to its structure, the device has a limited ability to draw complicated curve patterns, and also is unable to do so exactly.

As is the case with said original invention, the curve-drawing tool of this invention consists of two parts, the supporter A and the fixer B. This latter, however, is very different from the one of the original invention. The difference is that the fixer B of this invention is provided with the writing tool insertion hole at a position which corresponds with the central axis of the tape measure M which is inserted through the fixer, whereas the fixer of the original invention has a writing tool insertion hole provided on a portion of the fixer which projects from one side thereof. Also, approximately in the center of this fixer there is a hollow right-angled triangular structure 11 with its two side walls raised and its hypotenuse extending between the side walls and lying as the base between the right- and left-hand measure passing holes 7 and 8. Any desired drafting may be performed by arranging the supporter A and the fixer B at the required positions on the tape measure M.

The supporter A, which is to clip movably the tape measure M at any given point except its end, is made of an elastic metallic material. Said supporter A comprises a rectangular plate frame 1 lacking in its upper central half. Each of the outer free ends 2a and 3a of side pieces 2 and 3 of the plate frame 1 and the outer free end 4a of a supporting piece 4 projecting from the central portion of the back side of the plate frame 1, and having the same length as said both side pieces, are angularly extended perpendicularly with respect to the plane of FIG. 1; one opposite to the other in direction to form end flanges guiding the edges of the measure. A small pointed supporting pin 5 is fitted to the back of the supporting piece 4. The lower front of the plate frame 1 is marked with the reference point 6 indicating the central position of the pin 5, and the lower edge of the frame is graduated in the same way as the measure is.

The fixer B which is to clip the tape measure M at the end, is made of a transparent material such as, for example, synthetic resin material. It comprises a rectangular plate frame 10 having on the aft end of its back an elastic piece 9 used for clipping. The elastic piece 9 is in the form of an elongated leaf spring member riveted at one end to the frame 10 and pressing at its opposite end against the frame member 10 while extending between its ends around that surface of the measure M which extends along the lower surface of the frame 10. In the central portion of the frame surface is formed a right-angled triangular hollow structure with its two side walls elevated and with its hypotenuse lying as the base between the side walls and the measure passing holes 7 and 8. Near the fore end of the plate frame 10 is provided a writing tool inserting portion 13 with a taper hole 12 at a position along the central axis of the tape measure M passed through the fixer. And the back side of the plate frame 10 is marked with a reference line 14 indicating the central position of the writing tool inserting portion 13, and notches 15 and 16 are respectively provided at both ends of said reference line.

Next, explanation will be made of the behavior and use of the device of the invention constructed as stated above. The end of the tape measure M is passed from the back side of the fixer B, through the measure passing hole 7, and is lowered along the hypotenuse base wall from the straight line end 11a of the right-angled triangular structure until said measure end reaches the terminating end 11b of said hypotenuse wall, where the end is folded back and clipped firmly by the elastic piece 9 to the aft end of the back of the fixer B. At this time the reference graduation point 0 (FIG. 2) of the tape measure M is made to agree or line up with the hypotenuse terminating end 11b of said triangular structure. Of course, the tape measure M which is used has its measuring graduations starting at a point 0 spaced sufficiently from the free end of the tape so that the part extending beyond the initial graduation 0 can extend from the edge 11b through the space between the frame 10 and the spring clip 9. Then, the tape measure M is pulled taut, so that it will form a triangle which has as its three vertexes the lower edge 7a of the measure passing hole 7, the apex 11a of the triangular structure 11 and the hypotenuse terminating end 11b of the right-angled triangular structure. And the right-angled triangular structure 11 and the writing tool inserting portion 13 are so arranged that the sum of the length of the tape measure M from the lower edge 7 a of the measure passing hole 7 to the apex 11a of said structure and the length of the hypotenuse of the triangular structure be equal to the straight distance from said edge 7a of the hole 7 to the reference line 14 of the writing tool inserting portion 13. Therefore, the reference point 0 of the tape measure M corresponds to the reference line 14 of the writing tool inserting portion 13.

Next, the leftward extending tape measure M is clipped between the side pieces 2 and 3 and the supporting piece 4, and the required point of graduation is made to agree to the reference point 6 of the supporting piece 4. In this case, since the supporter A clips the tape measure by the supporting piece 4 and the side pieces 2 and 3 with appropriate strength, the required point of said tape measure will be retained firmly at the position of the reference point 6.

A first example of drafting which is performed using this curve drawing tool will be as follows. The support A, adjusted to a predetermined radius is fixed by the supporting pin 5 on the prescribed sheet of paper. Then, a writing tool such as a pencil is inserted into a tapered hole 12 of the writing tool inserting portion 13 of the fixer B. Then, the fixer B is swung round while pulling it to the right with such appropriate strength that the tape measure is stretched straight, so that the locus 17 of a true circle having the predetermined radius can be obtained. The circle 17 is shown for convenience in FIG. 4 at a right angle to the tape measure. Such a locus of a true circle is easy to obtain also by means of conventional circle-drawing tools including the above mentioned original invention. The present invention, however, has an out standing feature of being able to draw easily other complicated curve patterns, as shown by the second and third examples of usage given below. As shown in FIG. 5, the tape measure is clipped with elastic piece 9 at the end, and the tape measure is slackened over the right-angle triangular structure 11. By strongly pulling the fixer B to the right as the measure is being swung, the tape measure M will be drawn out from fixer B toward the supporter A guided by the elastic piece 9 available for clipping. Consequently, the revolving radius extending from the supporter A with the supporting pin 5 serving as the center $r_2$ changes, and an approximation of a spiral curve 20 may be according to the traction force combined with the angular velocity of swinging.

A third example of usage of this invention in which it is imperative to utilize the slackening of the tape measure over the right-angled triangular structure is designed to draw whirlpool patterns portions of an involute of a polygon. In this third method, the tape measure M over the right-angled triangular structure is first made to have an appropriate slackening, or as much slackening as would allow the required largest possible revolving radius to be obtained. The supporting pin 5 of the supporter A is fixed at the predetermined position, on a sheet of paper. Then, the tape measure M is turned round by a predetermined angle to obtain the initial circular locus 18. Then, as much length of the tape measure M as may be necessary is drawn out through the elastic clipping piece and the end of the writing tool is brought to the terminating end P of the initial circular locus, and the supporting pin 5 of the supporter A is transferred to a predetermined location $r_3$. By swinging the tape measure M again, the next circular locus 19 may be obtained.

Furthermore, if the above three usages of this invention are appropriately combined with one another, even the most complicated curves of any kind, which could never have been drawn by any conventional tools designed for the purpose, can be drawn quite easily, surely and quickly.

The foregoing shows only one form of this invention. There are, however, many other embodiments within the scope of this invention whose spirit remains unchanged. Its applications can be found not only in the field of drawing making but also in a wide range of other activities without any alteration.

Thus it will be seen that with the structure of the invention the supporter A forms a support means which slidably engages the tape measure M and which serves to support the center 5. The fixer B serves by way of its rectangular frame member 10 and the spring clip 9 to fix the free end of the tape with respect to the opening 12 which receives the writing instrument 21, this arrangement being such that when the tape is extended around the hollow triangular structure 11 the initial, zero graduation of the tape measure is situated in a position corresponding to that which it would have at the line 14 extending in alignment with the opening 12 if the tape measure M were straight instead of in a loop extending around the triangular structure 11. Thus, this triangular structure 11 forms a loop-forming means carried by the fixer means B and serving by way of its dimensions to situate the initial graduation of the tape at a location corresponding to the location of the opening 12 which receives the marking instrument 21.

I claim:

1. A curve-drawing assembly comprising an elongated flexible tape measure, support means slidably engaging said tape measure for movement longitudinally therealong and supporting a center pivot, and fixer means fixed with a free end portion of said tape measure and said fixer means being formed longitudinally beyond said tape measure with an opening situated beyond said end portion of said tape measure for receiving a marking instrument, said fixer means carrying a loop-forming means and being formed with a pair of openings situated one before and one after said loop-forming means so that the tape measure can extend through said openings and around said loop-forming means to form a loop at said fixer means.

2. The combination of claim 1 and wherein said tape measure has an initial zero graduation, one of said openings between which said loop-forming means is located being situated between said instrument-receiving opening and a front end of said loop-forming means, and said opening for receiving said marking instrument being situated at a location where the initial zero graduation of said tape measure would be located if the tape measure did not extend around said loop-forming means and instead were extended straight up to said opening for receiving the marking instrument.

3. The combination of claim 2 and wherein said fixer means includes an elongated substantially rectangular frame having a substantially central rectangular opening in which said loop-forming means is located.

4. The combination of claim 3 and wherein said loop-forming means is in the form of a hollow triangular structure having a pair of side walls extending upwardly from said rectangular frame and a base wall extending between said side walls.

5. The combination of claim 4 and wherein said side walls of said loop-forming means are respectivley of the configuration of a right triangle having an inclined hypotenuse edge along which said base wall extends.

6. The combination of claim 5 and wherein said frame carries at an underside distant from said instrument-receiving opening a clip through which two layers of the measuring tape extend, said layers including an upper layer which engages the underside of said frame, extends upwardly through an opening in the frame distant from said instrument receiving opening, then around said loop-forming means, and from the latter through the opening between said loop-forming means and said instrument-receiving opening and back to said clip between the latter and said upper layer.

7. The combination of claim 6 and wherein said frame of said fixer means is formed at opposed side edges with a pair of notches respectively aligned with said instrument-receiving opening.

8. The combination of claim 7 and wherein an elongated index extends between said notches and said instrument-receiving opening.

9. The combination of claim 8 and wherein said instrument-receiving opening is situated along the central longitudinal axis of the tape measure.

10. The combination of claim 9 and wherein said instrument-receiving opening is tapered.

* * * * *